(12) United States Patent
Kim

(10) Patent No.: US 8,452,337 B2
(45) Date of Patent: May 28, 2013

(54) NAVIGATION METHOD AND APPARATUS FOR MOBILE TERMINAL

(75) Inventor: Kyung-Geun Kim, Seongnam (KR)

(73) Assignee: LG Electronics Inc., Seoul (KR)

( * ) Notice: Subject to any disclaimer, the term of this patent is extended or adjusted under 35 U.S.C. 154(b) by 383 days.

(21) Appl. No.: 12/465,783

(22) Filed: May 14, 2009

(65) Prior Publication Data
US 2010/0048184 A1    Feb. 25, 2010

(30) Foreign Application Priority Data

Aug. 19, 2008  (KR) .................. 10-2008-0081057
Aug. 26, 2008  (KR) .................. 10-2008-0083507

(51) Int. Cl.
*H04B 1/38*    (2006.01)

(52) U.S. Cl.
USPC .................. 455/566; 455/457; 455/556.1

(58) Field of Classification Search
USPC ........................................ 455/566
See application file for complete search history.

(56) References Cited

U.S. PATENT DOCUMENTS

| | | | |
|---|---|---|---|
| 2002/0142803 A1* | 10/2002 | Yamamoto | 455/557 |
| 2003/0216861 A1* | 11/2003 | Sakata | 701/211 |
| 2008/0040026 A1* | 2/2008 | Hui | 701/201 |
| 2009/0027301 A1* | 1/2009 | Mosko | 345/1.1 |
| 2009/0181699 A1* | 7/2009 | Tysowski | 455/457 |
| 2009/0195506 A1* | 8/2009 | Geidl et al. | 345/168 |
| 2009/0231282 A1* | 9/2009 | Fyke | 345/169 |
| 2011/0128346 A1* | 6/2011 | Pham et al. | 348/14.07 |

\* cited by examiner

*Primary Examiner* — Kiet Doan
*Assistant Examiner* — Mazda Sabouri
(74) *Attorney, Agent, or Firm* — Birch, Stewart, Kolasch & Birch, LLP

(57) ABSTRACT

A method of controlling a navigation apparatus and which includes determining whether a phone call mode has been selected on the navigation terminal, displaying phone call information corresponding to the phone call mode when the determining step determines the phone call mode has been entered, and displaying traveling route guidance information on the phone call information during the phone call mode.

22 Claims, 17 Drawing Sheets

NAVIGATION METHOD AND APPARATUS FOR MOBILE TERMINAL

CROSS-REFERENCE TO A RELATED APPLICATION

The present invention claims priority to Korean Applications No. 10-2008-0081057 and 10-2008-0083507, filed in Korea on Aug. 19, 2008 and Aug. 26, 2008, respectively, which are hereby incorporated by reference in their entirety.

BACKGROUND OF THE INVENTION

1. Field of the Invention

The present invention relates to a navigation apparatus and corresponding method of controlling a navigation apparatus.

2. Description of the Related Art

A vehicle navigation device provides a user with road guidance information based on a GPS (Global Positioning System) signal and map information. For example, FIG. 1 is a block diagram of a related art vehicle navigation system. As shown in FIG. 1, the related art vehicle navigation system includes at least one satellite 1, an antenna station 2, an information providing center 3 providing traffic information, and a vehicle navigation device 4 mounted in a vehicle. Thus, the vehicle including the navigation device 4 can receive traffic information and road guidance information provided by the vehicle navigation system.

However, the vehicle navigation operates in a stand-alone mode and thus does not integrate well with other functions the user uses while driving their vehicle. This is problematic because the user has to individually operate the navigation function separately from other desired functions.

SUMMARY OF THE INVENTION

Accordingly, one object to the present invention is to address the above-noted and other problems with the related art.

Another object of the present invention is to provide a navigation apparatus and corresponding method for displaying route guidance information in a phone call information area displayed on a display of the navigation apparatus.

Still another object of the present invention is to provide a navigation apparatus and corresponding method for displaying a current speed of a vehicle and an enforced speed limit with route guidance information and phone call information.

Yet another object of the present invention is to provide a navigation apparatus and corresponding method for displaying position information of a called person or a calling person with route guidance information and phone call information.

Still another object of the present invention is to provide a navigation apparatus and corresponding method for changing a destination of route guidance information to a location of a called person or a calling person.

To achieve these and other advantages and in accordance with the purpose of the present invention, as embodied and broadly described herein, the present invention provides in one aspect a method of controlling a navigation apparatus, and which includes determining, via a controller of the navigation apparatus, whether a phone call mode has been entered on the navigation apparatus, displaying, via a display unit of the navigation apparatus, phone call information corresponding to the phone call mode when the determining step determines the phone call mode has been entered, and displaying, via the display unit, traveling route guidance information with the phone call information during the phone call mode.

In another aspect, the present invention provides a navigation apparatus including a controller configured to determine whether a phone call mode has been entered on the navigation apparatus, and a display unit configured to display phone call information corresponding to the phone call mode when the controller determines the phone call mode has been entered, and to display traveling route guidance information with the phone call information during the phone call mode.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
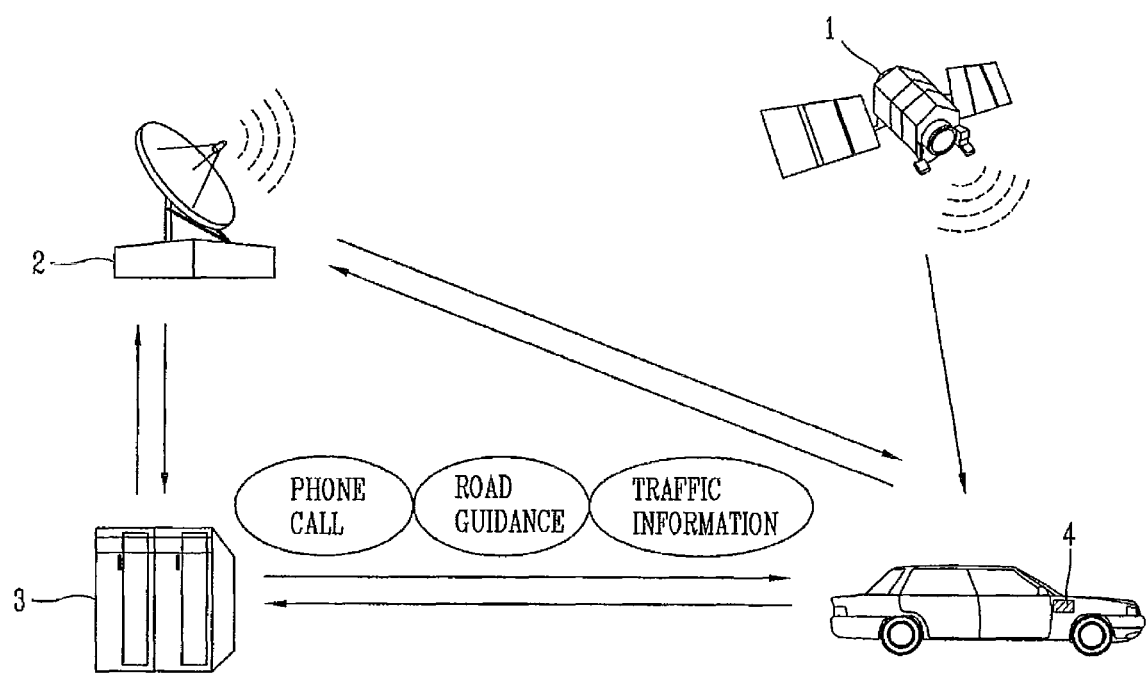
FIG. 1 is a block diagram illustrating a related art mobile vehicle navigation system.
Figure 2:
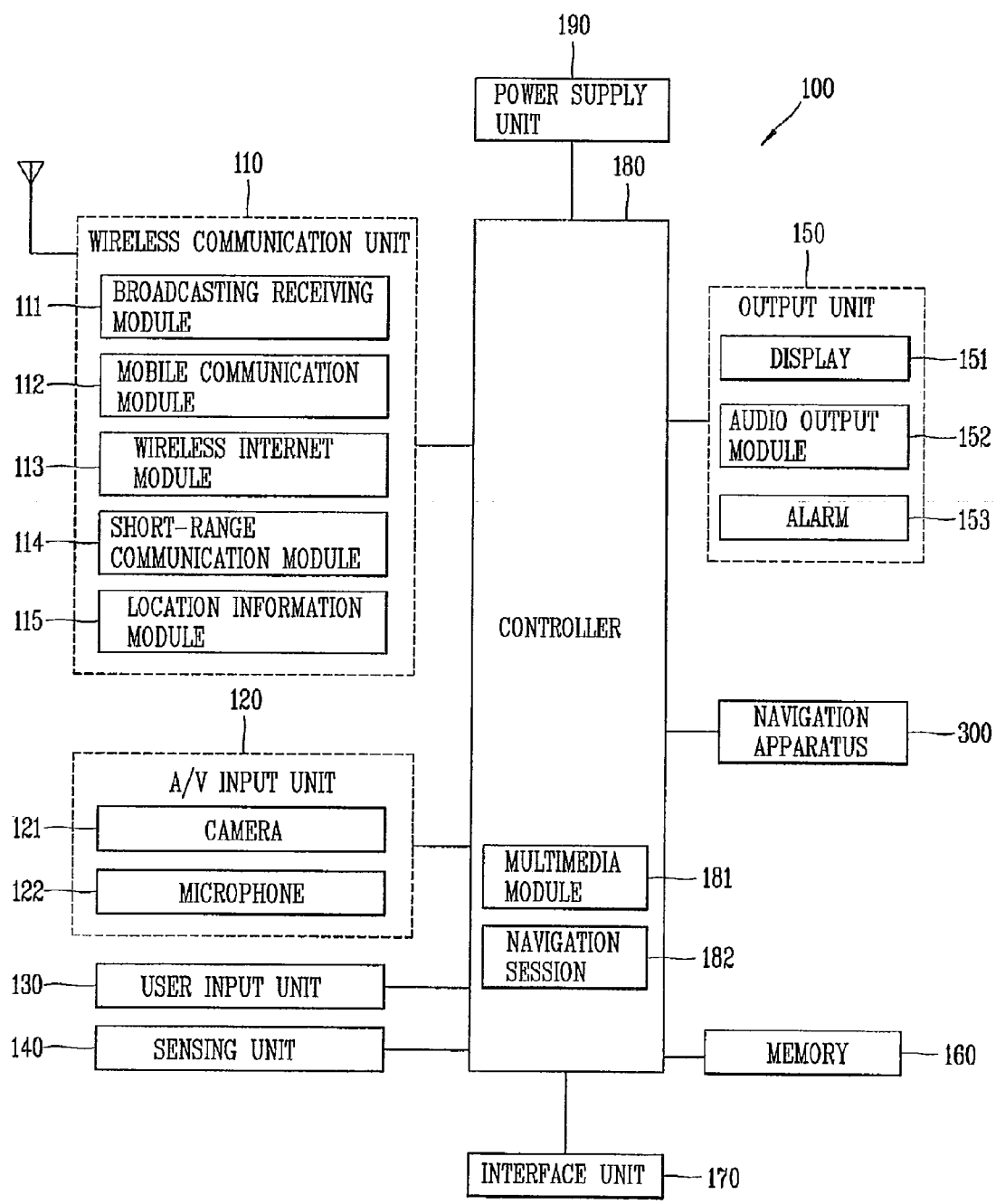
FIG. 2 is a block diagram illustrating a mobile communication terminal including navigation functions according to an embodiment of the present invention.

FIG. 2 is a block diagram of a mobile terminal 100 including a navigation function according to an embodiment of the present invention. As shown, the mobile terminal 100 includes a wireless communication unit 110 having one or more components, which permits wireless communication between the mobile terminal 100 and a wireless communication system or network within which the mobile terminal is located.

For example, as shown in FIG. 2, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel. In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of the digital multimedia broadcasting (DMB) system and an electronic service guide (ESG) of the digital video broadcast-handheld (DVB-H) system.

In addition, the broadcast signal may be implemented as a TV broadcast signal, a radio broadcast signal, and a data broadcast signal, among others. The broadcast signal may further include a broadcast signal combined with a TV or radio broadcast signal. The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others. Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof. In addition, as shown in FIG. 2, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, generally includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, an orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is implemented to couple the mobile terminal 100 with external devices such as wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 includes various components which support the output requirements of the mobile terminal 100. The mobile terminal 100 also includes a display module 151 (hereinafter referred to as the display 151) that visually displays information associated with the mobile terminal 100. For instance, if the mobile terminal 100 is operating in a phone call mode, the display 151 may provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display, a three-dimensional display, and a transparent OLED (TOLED).

The mobile terminal 100 may also include one or more of such displays. An example of a two-display embodiment is one in which one display is configured as an internal display (viewable when the terminal is in an opened position) and a second display configured as an external display (viewable in both the open and closed positions). FIG. 2 further shows the output unit 150 having an audio output module 152 which supports the audio output requirements of the mobile terminal 100. The audio output module 152 can be implemented using one or more speakers, buzzers, other audio producing devices, and combinations thereof. Further, the audio output module 152 functions in various modes including a call-receiving mode, a call-placing mode, a recording mode, a voice recognition mode and a broadcast reception mode. During operation, the audio output module 152 outputs audio relating to a particular function (e.g., a call received, message received, and errors).

In addition, the output unit 150 is further shown having an alarm 153, which is used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal 100 receiving a call or message. As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc. Further, the memory 160 shown in FIG. 2 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that generally controls the overall operations of the mobile terminal 100. For instance, the controller 180 performs the control and processing associated with voice calls, data communications, instant message communications, video calls, camera operations and recording operations. As shown in FIG. 2, the controller 180 also includes a multimedia module 181 for providing multimedia playback functions. The multimedia module 181 may be configured as part of the controller 180, or may be implemented as a separate component. In addition, a power supply 190 provides power used by the various components for the portable device. The provided power may be internal power, external power, or combinations thereof.

Further, a navigation session 182 is also included within the controller 180 of the mobile terminal 100 according to an embodiment of the present invention. In one embodiment, the navigation session 182 is configured to display road guidance information (route guidance information) on a display and display the route guidance information with or on phone call information during a phone call. For instance, the navigation session 182 is configured to match a current map matching link, to a current position of a vehicle, which is extracted from map data corresponding to a traveling route from a departing place to a destination or a current traveling route without having a destination, and to generate route guidance information based on the matching result. In addition, the navigation session 182 is configured to display the route guidance information on the display, and during a phone call mode, to display the route guidance information within a display area of phone call information. These features will be discussed in more detail later.

Figure 3:
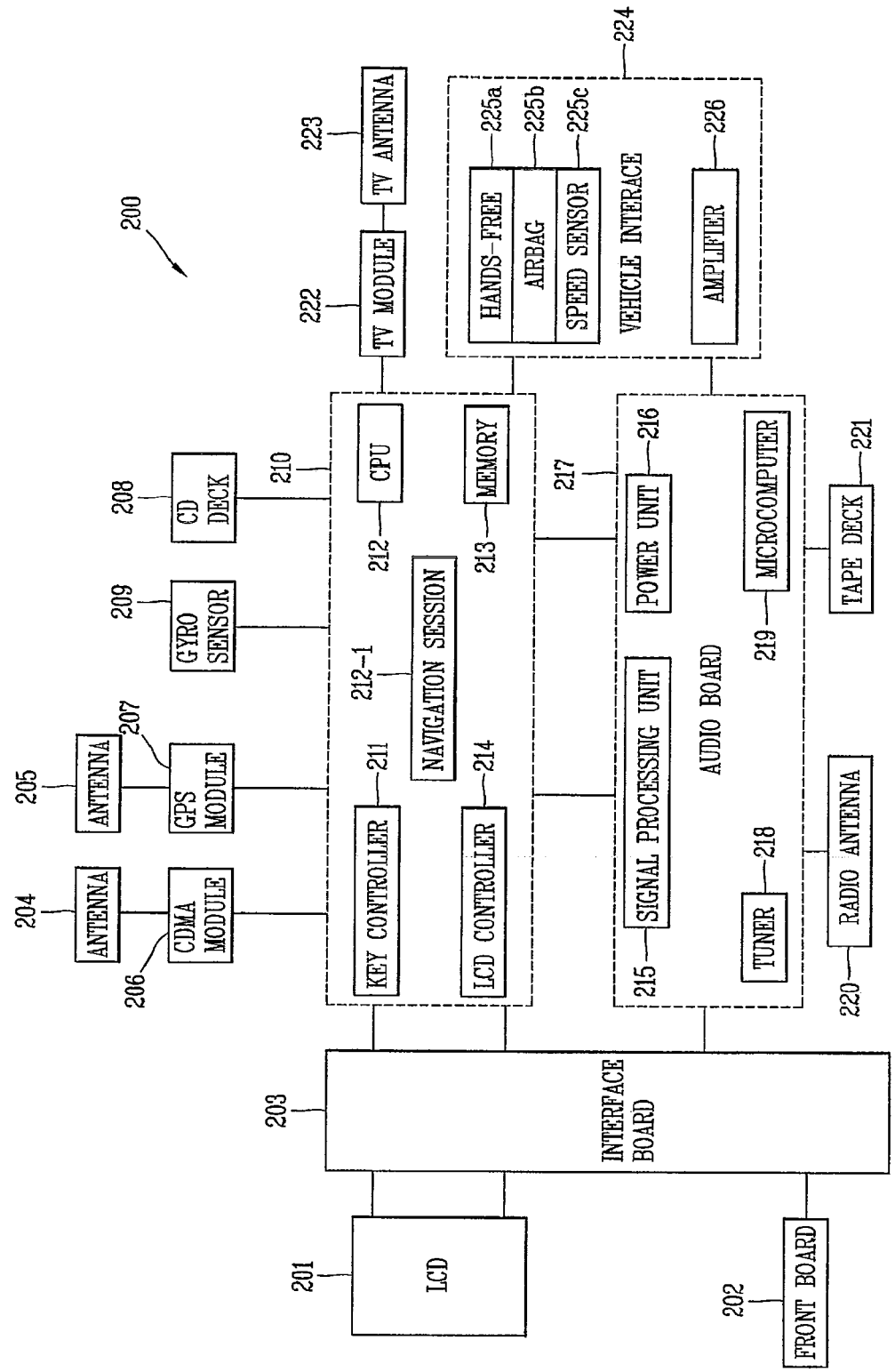
FIG. 3 is a block diagram illustrating a telematics system including navigation functions according to an embodiment of the present invention.

Next, FIG. 3 is a block diagram of a telematics system 200 including a vehicle navigation apparatus according to an embodiment of the present invention. In this example, the system 200 is installed in a vehicle driven by a user. As shown in FIG. 3, the telematics system 200 includes a vehicle navigation session 212-1 included in a main board 210. The main board 210 also includes a key controller 211, a CPU (Central Processing Unit) 212 for controlling overall operations in the telematics system 200, a memory 213 for storing various information, a key controller 211 for controlling various key signals, and an LCD controller 214 for controlling an LCD.

Further, the memory 213 stores map information (e.g., map data) for displaying road guidance information on a digital map. Also, the memory 213 stores a traffic information collecting control algorithm for inputting traffic information according to the situation of a road along which the vehicle currently travels and information for controlling the algorithm. Also included is a CDMA module 206 associated with an antenna 204, and a GPS module 207 associated with an antenna 205. The GPS module 207 also operates to receive a GPS signal for tracking a travel route from a start point to a destination, transmitting traffic information collected by the user as a GPS signal, and provides information about the current position of the vehicle. The system 200 also includes a CD deck 208 for reproducing data recorded in a CD (Compact Disk), and a gyro sensor 209. In addition, the CDMA module 206 and the GPS module 207 receive signals via the antennas 204 and 205.

The system 200 also includes a TV module 222 connected with the main board 210 and receives a TV signal via a TV antenna 223. The main board 210 is also connected with an LCD 201 via an interface board 203 and is controlled by the LCD controller 214. A front board 202 is also connected to the main board 210 via the interface board 203 and is controlled by the key controller 211. Further, the LCD 201 displays various video signals and character signals, and the front board 202 includes buttons for various key signal inputs and provides a key signal corresponding to a button selected by the user to the main board 210. The front board 202 also includes a menu key for directly inputting traffic information. The menu key may be configured to be controlled by the key controller 211.

The system 200 also includes an audio board 217 connected with the main board 210 and that processes various audio signals. As shown in FIG. 3, the audio board 217 includes a microcomputer 219 for controlling the audio board 217, a tuner 218 for receiving a radio signal, a power source unit 216 for supplying power to the microcomputer 219 and a signal processing unit 215 for processing various voice signals. The audio board 217 can also be associated with a radio antenna 220 for receiving a radio signal and a tape deck 221 for reproduce an audio tape.

The audio board 217 and the main board 210 also may interface with a vehicle interface 224. Namely, the audio board 217 and the main board 210 are connected to the vehicle interface 224. As shown, the vehicle interface 224 includes an amplifier 226 for outputting a voice signal processed by the audio board 217, a hands-free unit 225*a* for inputting a voice signal, an airbag 225*b* configured for the security of a passenger, a speed sensor 225*c* for detecting the speed of the vehicle, or the like. The speed sensor 225*c* calculates a vehicle speed and provides the calculated vehicle speed information to the CPU 212.

In addition, the functions of the navigation session 215 according to the embodiments of the present invention can be performed by the CPU (controller) 212 of the telematics system 200. As discussed above, FIG. 3 illustrates the navigation session 212-1 being included in a vehicle. However, the navigation session 212-1 according to embodiments of the present invention can also be included in a mobile terminal such as a cell phone that is carried by a user.

Further, the navigation session 182 applicable to the mobile terminal 100 according to one embodiment of the present invention is configured to match a current map matching link, which is extracted from map data corresponding to a traveling route from a departing place to a destination or a current traveling route without having a destination, to a current position of a vehicle, and to generate route guidance information based on the matching result. In addition, the navigation session 182 is configured to display the route guidance information on the display, and during the phone call mode, display the route guidance information within a display area of phone call information.

Figure 4:
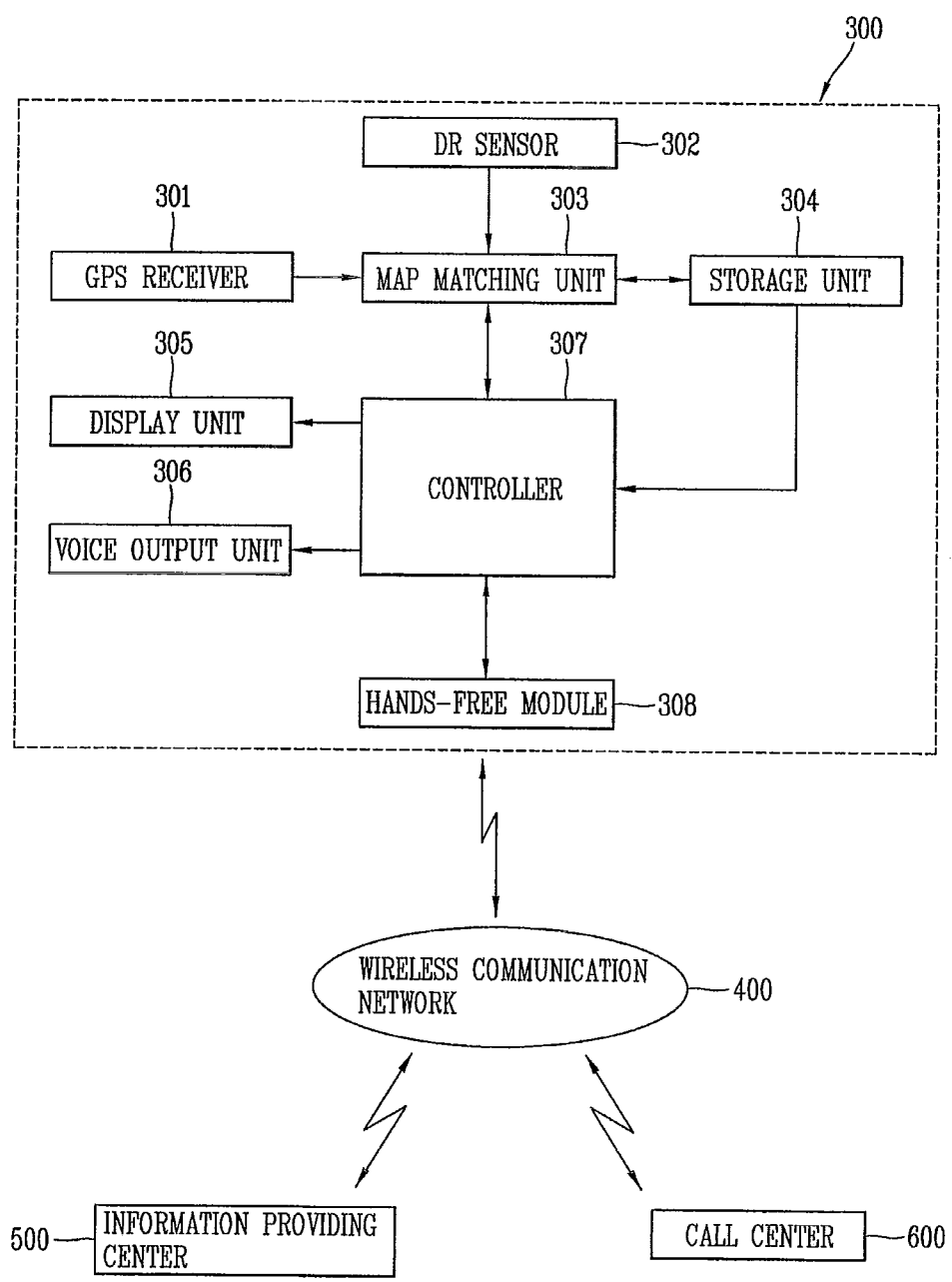
FIG. 4 is a block diagram illustrating a navigation apparatus according to an embodiment of the present invention.

Next, FIG. 4 is a block diagram illustrating a vehicle navigation apparatus 300 according to a first embodiment of the present invention. As shown in FIG. 4, the navigation apparatus 300 includes a GPS receiver 301 for receiving a GPS signal from a satellite and generating first vehicle location data of the navigation apparatus based on the received GPS signal, a DR (Dead-Reckoning) sensor 302 for generating second vehicle location data based on a travel direction and the speed of a vehicle, and a storage unit 304 for storing map data. The apparatus 300 also includes a map matching unit 303 for generating a vehicle estimated location based on the first and second vehicle location data, matching the generated vehicle estimated location and a line (map matching link or a map matching road) in map data stored in the storage unit 304, and outputting the matched map information (map matching results).

Also included is a hands-free module 308 for performing phone calls through a call center 600, a controller 307 for generating route guidance information based on the matched map information, and receiving real-time traffic information from an information providing center 500, a display unit 305 for displaying a route guidance map included in the route guidance information, and a voice output unit 306 for outputting the route guidance voice information (route guidance voice message) included in the route guidance information. The hands-free module 308 may be a hands-free module having a BLUETOOTH function, for example.

In addition, the controller 307 applied to the navigation apparatus according to one embodiment of the present invention displays the route guidance information on the display 305, and displays phone call-related information together with the route guidance information on the display 305 during the phone call. Therefore, because the navigation method and apparatus according to one embodiment of the present invention displays the road or route guidance information on the display 305, and displays the phone call-related information together with the route guidance information on the display 305 during the phone call, the user can effectively receive the route guidance service during the phone call mode.

In addition, the GPS receiver 301 may be implemented as the GPS module 207 in the telematics system 200, and the storage unit 304 may be implemented as the memory 213 in the telematics system 200. Further, the display 305 may be the LCD 201 in the telematics system 200, and the voice output unit 306 may be the amplifier 226 in the telematics system 200. In addition, the respective functions of the map matching unit 303 and the controller 307 may be performed by the central processing unit 212 in the telematics system 200. A technique for generating the estimated vehicle position based on the first vehicle position data generated by the GPS receiver 301 and the second vehicle position data generated by the DR sensor 302 is a known technique, and thus detailed explanations are omitted.

Hereinafter, an embodiment of the present invention will be described in detail with reference to FIG. 4. First, when the user selects a route guidance mode, the GPS receiver 301 receives a GPS signal from a satellite, generates first vehicle position data in real time based on longitude and latitude coordinates included in the received GPS signal and outputs the first vehicle position data to the map matching unit 303.

Also, the position information of the vehicle may be received through the GPS receiver 301 as well as Wi-Fi or wibro communication.

In addition, the DR sensor 302 generates second vehicle position data based on a traveling direction and speed of a vehicle, and outputs the second vehicle position data to the map matching unit 303. The map matching unit 303 generates an estimated vehicle position based on the first vehicle position data and the second vehicle position data, matches the generated vehicle position to the map data and outputs the matched map information (map matching result) to the controller 307. For instance, the map matching unit 303 generates the estimated vehicle position based on the first vehicle position data and the second vehicle position data, matches the generated vehicle position to links in the map data stored in the storage unit 304 according to a link sequence, and then outputs the matched map information (map matching result) to the controller 307.

The controller 307 also generates route guidance information based on the matched map information, and outputs the generated route guidance information to the display 305 and the voice output unit 306. The voice output unit 306 may also be implemented as a speaker. In addition, the controller 307 displays the route guidance information on the display 305, and simultaneously, determines a connected state of a phone call through the hands-free module 308. For instance, the controller 307 uses the hands-free module 308 to detect whether a call signal has been received or sent, thereby determining the connected state of the phone call.

The controller 307 also generates phone call-related information in the phone call connected state, and displays the generated phone call-related information on the display 305. The phone call-related information may include a call participant phone number (e.g., a caller phone number), a call participant name (e.g., a caller name), a call time and the like. Also, if a phone call button is selected by the user while the route guidance information is provided, the controller 307 may display the route guidance information within the phone call-related information. The controller 307 also displays the route guidance information on or within the phone call-related information displayed on the display 305. In one embodiment, the display 305 is implemented as a touch screen.

Figure 5:
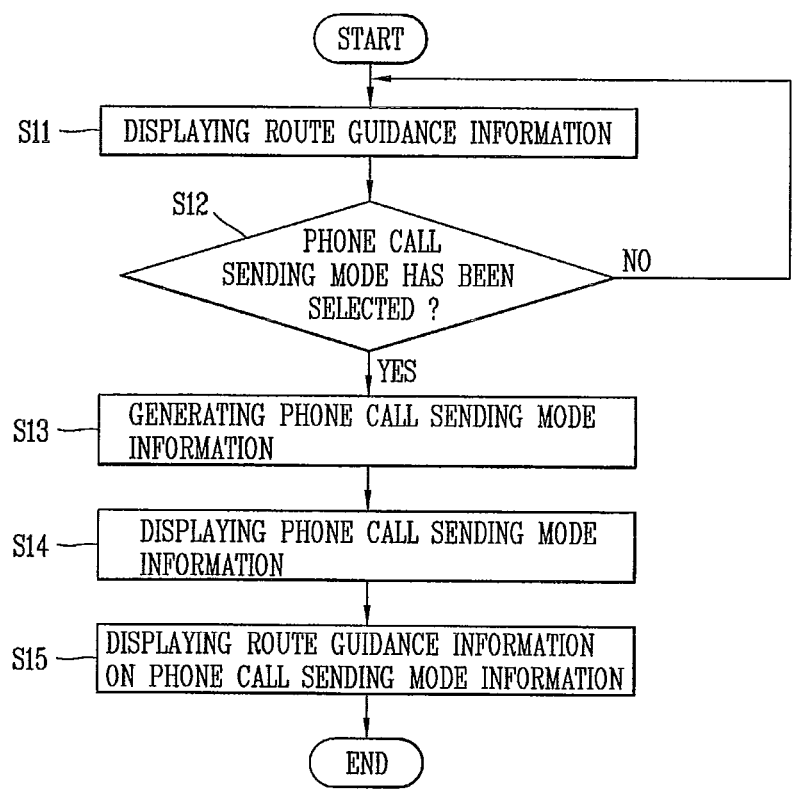
FIG. 5 is a flowchart illustrating a navigation method according to a first embodiment of the present invention.

Next, FIG. 5 is a flowchart illustrating a navigation method according to one embodiment of the present invention. FIG. 4 will also be referred to throughout the description of the embodiments of the present invention. In this embodiment, the map matching unit 303 generates an estimated vehicle position based on the first vehicle position data and the second vehicle position data, and reads map data corresponding to a traveling route from the storage unit 304. Further, the traveling route may be a traveling route from a departing place to a destination or a traveling route without any selected destination.

The map matching unit 303 also matches the estimated vehicle position to a link (road) included in the map data, and then outputs the matched map information (map matching result) to the controller 307. For instance, the map matching unit 303 generates the estimated vehicle position based on the first and second vehicle position data, matches the generated vehicle position to the links in the map data stored in the storage unit 304 according to a link sequence, and then outputs the matched map information (map matching result) to the controller 307.

The controller 307 then generates route guidance information based on the matched map information, and outputs the generated route guidance information to the display 305 and the voice output unit 306. The display 305 then displays the route guidance information and the voice output unit 306 outputs voice information including or corresponding to the route guidance information (S11). The controller 307 also determines a connected state of the phone call through the hands-free module 308. For instance, the controller 307 determines whether or not the user has selected a phone call sending mode to make a phone call (S12), and when the phone call sending mode is selected (Yes in S12), generates phone call sending mode information (S13), and displays the phone call sending mode information on the display 305 (S14).

The phone call sending mode information may include, for example, a header portion indicating a connected state of a phone call, a phone call-related information display portion indicating a call participant phone number (e.g., a recipient phone number), a call participant name (e.g., a recipient name), a call time, a key pad indicating numbers and symbols used to make a phone call, and a plurality of control buttons or keys for controlling a phone call. The controller 307 also graphically displays the header portion, the phone call-related information display portion, the key pad and the control buttons on the display 305, so as to allow the user to select desired functions through the touch screen.

Figure 6:
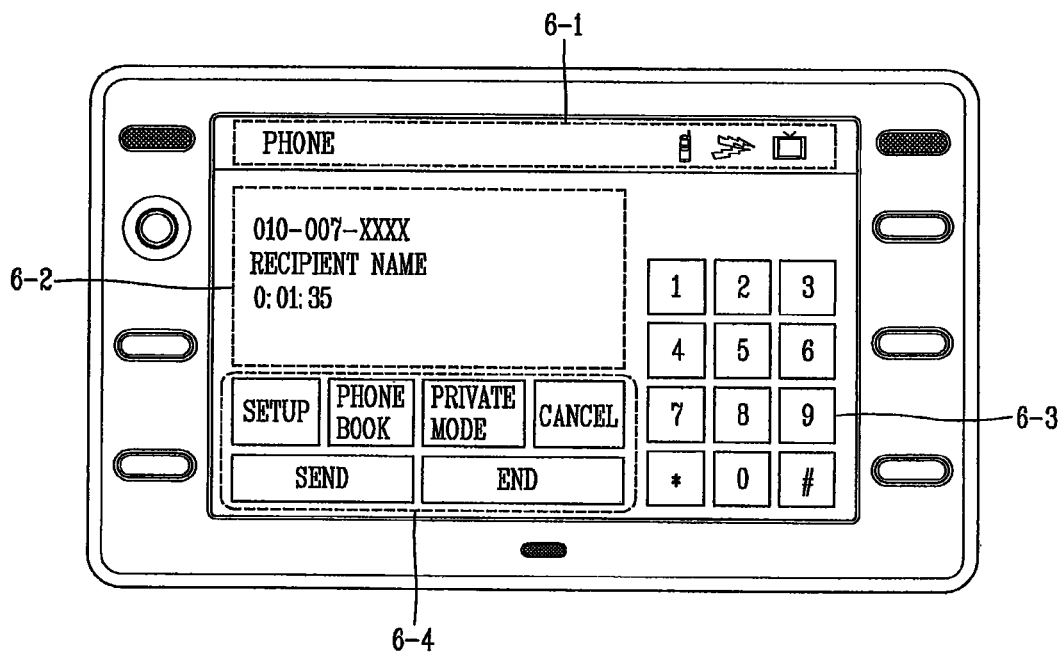
FIG. 6 is an overview of a display screen including phone call sending mode information according to the first embodiment of the present invention.

For example, FIG. 6 is an overview of a display screen including phone call sending mode information according to the first embodiment of the present invention. Referring to FIG. 6, if the user has selected the phone call sending mode while the route guidance information is being displayed, the controller 307 displays phone call sending mode information on the display 305. In this example, the phone call sending mode information includes a header portion 6-1 indicating a connected state of a phone call, a phone call-related information display portion 6-2 indicating a call participant phone number (e.g., a recipient phone number of the person being called), a call participant name (e.g., a recipient name) and a call time, a key pad 6-3 including numbers and symbols used to make a phone call, and a plurality of control buttons 6-4 for performing functions related to a phone call. For example, and as shown in FIG. 6, the plurality of control buttons 6-4 may include a setup key for a phone call environment setting, a phone book key, a private mode key, a Cancel key, a Send key and an End key.

Figure 7:
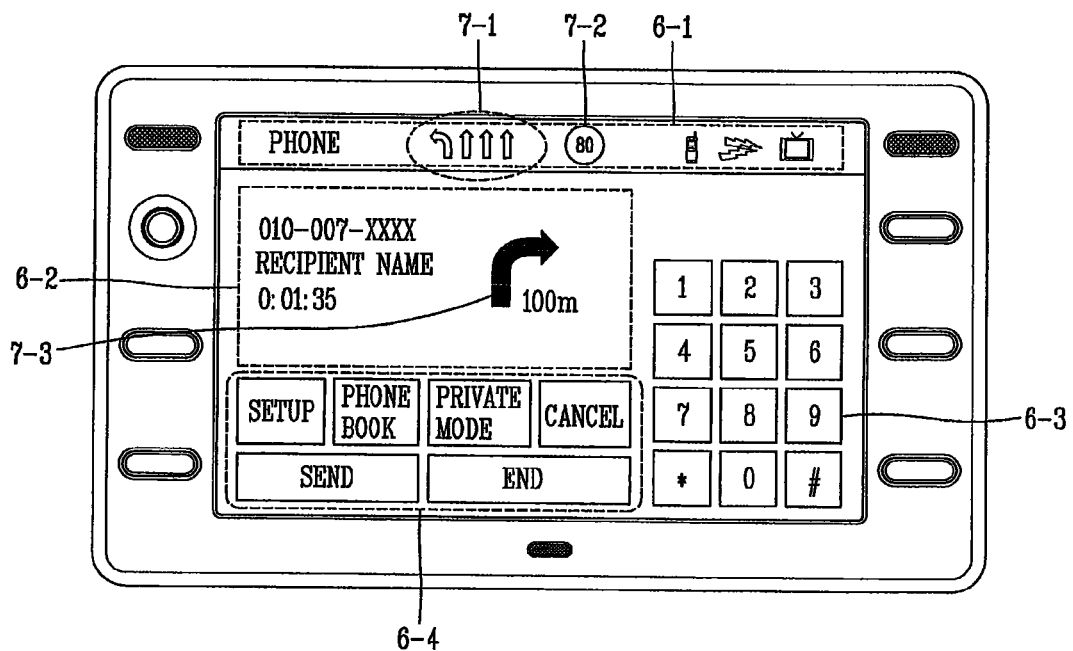
FIG. 7 is an overview of a display screen including road guidance information displayed with the phone call sending mode information according to the first embodiment of the present invention.

Then, with reference to FIG. 5, in the phone call connected state, the controller 307 displays the route guidance information within a display area of the phone call sending mode information displayed on the display 305 (S15). For example, FIG. 7 is an overview of a display screen including route guidance information displayed on the phone call sending mode information according to the first embodiment of the present invention. Referring to FIG. 7, if the phone call sending mode is selected while the route guidance information is being displayed, the controller 307 reads lane information 7-1, a speed limit 7-2 and turn-by-turn information 7-3 from pre-stored map data. The controller 307 then displays the read lane information 7-1 and the speed limit 7-2 on the header portion 6-1, and displays the read turn-by-turn information 7-3 on the phone call-related information display portion 6-2. Alternatively, the controller 307 may display the turn-by-turn information 7-3 on the header portion 6-1, and display the lane information 7-1 and the speed limit 7-2 on the phone call-related information display portion 6-2.

Figure 8:
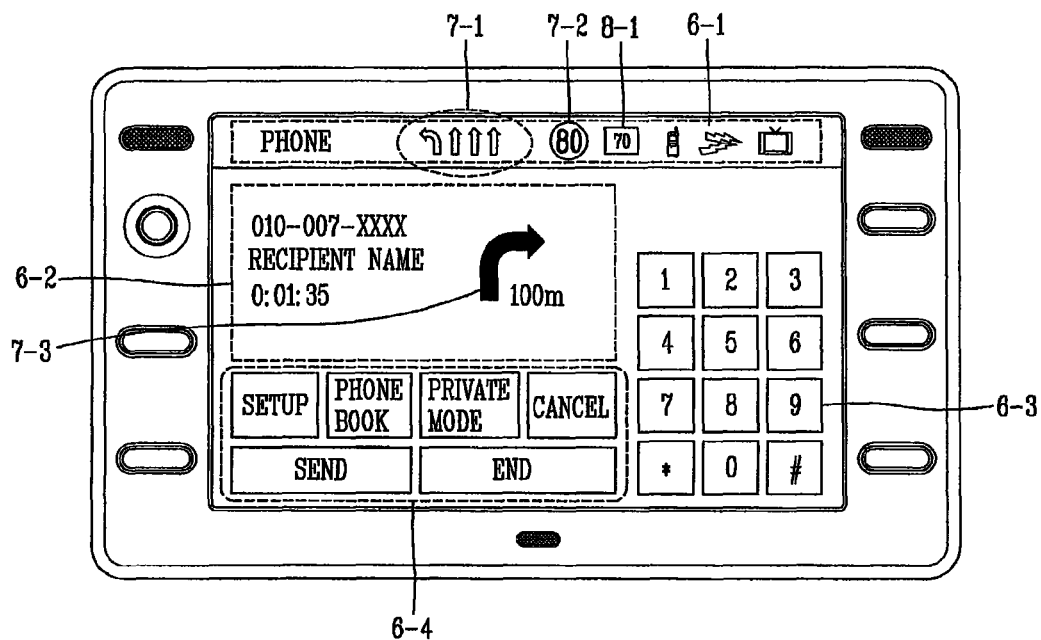
FIG. 8 is an overview of a display screen including current speed information displayed with the phone call sending mode information according to the first embodiment of the present invention.

Next, FIG. 8 is an overview of a display screen including current speed information displayed with the phone call sending mode information according to the first embodiment of the present invention. Referring to FIG. 8, if the phone call sending mode is selected while the route guidance information is being displayed, the controller 307 may further display a current speed 8-1 of a vehicle on the header portion 6-1. Further, the controller 307 may enlarge a size of a numerical figure representing the speed limit 7-2 and reduce a size of a numerical figure representing the current speed 8-1 of a vehicle, thereby allowing the user to easily distinguish the speed limit 7-2 and the current speed 8-1. The controller 307 may also display the speed limit 7-2 and the current speed 8-1 in the form of one or more of a color, an icon, an avatar, a pattern and a symbol as well as the size of the numerical figure.

Figure 9:
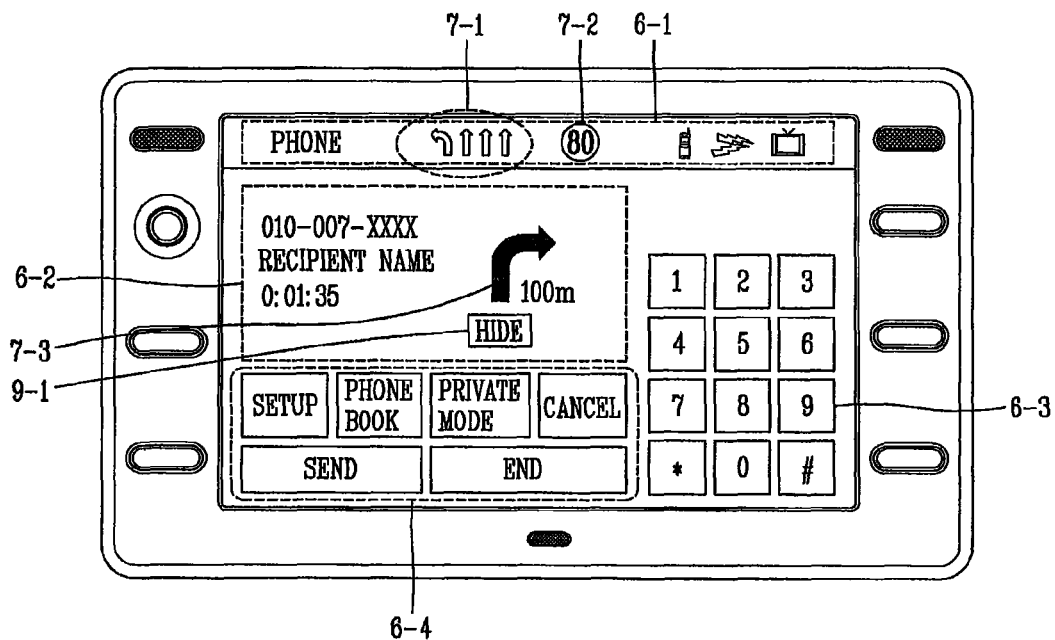
FIG. 9 is an overview of a display screen including a hide/view button displayed with the phone call sending mode information according to the first embodiment of the present invention.

Next, FIG. 9 is an overview of a display screen including a hide/view button displayed with the phone call sending mode information according to the first embodiment of the present invention. Referring to FIG. 9, if the phone call sending mode is selected while the route guidance information is being displayed, the controller 307 may further display a button 9-1 (or a key) for hiding or showing the turn-by-turn information 7-3 displayed on the phone call-related information display portion 6-2. In addition, the controller 307 may control a display of the turn-by-turn information 7-3 by additionally displaying the button 9-1 at a lower end of the turn-by-turn information 7-3 displayed on the phone call-related information display portion 6-2.

Further, the controller 307 may use the selection of the button 9-1 to hide or show the lane information 7-1 and the speed limit 7-2 as well as the turn-by-turn information 7-3. In addition, the controller 307 may display the turn-by-turn information on the header portion 6-1 or may display the lane information 7-1 or the speed limit 7-2 on the phone call-related information display portion 6-2.

Figure 10:
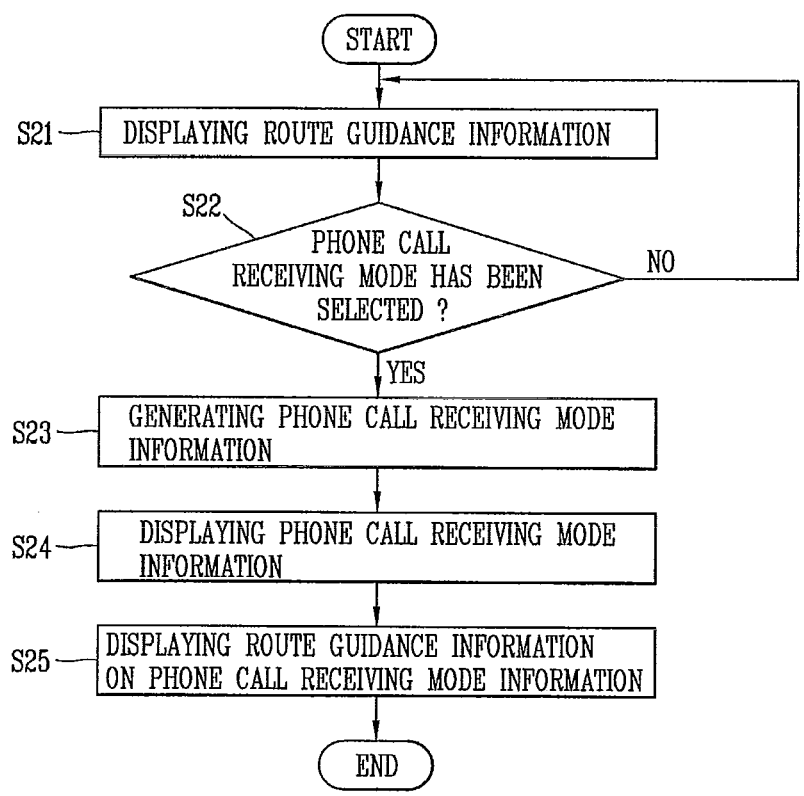
FIG. 10 is a flowchart illustrating a navigation method according to a second embodiment of the present invention.

Next, FIG. 10 is a flowchart illustrating a navigation method according to a second embodiment of the present invention. Similar to the first embodiment, the map matching unit 303 first generates an estimated vehicle position based on the first vehicle position data and the second vehicle position data, and reads map data corresponding to the traveling route from the storage unit 304. In addition, the traveling route may be a traveling route from a departing place to a destination, or a traveling route without any selected destination. The map matching unit 303 also matches the estimated vehicle position to a link (road) included in the map data, and then outputs the matched map information (map matching result) to the controller 307. For instance, the map matching unit 303 generates the estimated position of the vehicle based on the first and second vehicle position data, matches the generated vehicle position to the links in the map data stored in the storage unit 304 according to a link sequence, and then outputs the matched map information (map matching result) to the controller 307.

The controller 307 then generates route guidance information based on the matched map information, and outputs the generated route guidance information to the display 305 and the voice output unit 306. The display 305 then displays the route guidance information and the voice output unit 306 outputs voice information related to or included in the road guidance information (S21). While the display 305 displays the route guidance information, the controller 307 simultaneously determines a connected state of the phone call through the hands-free module 308. For instance, the controller 307 determines whether or not the user has selected a phone call receiving mode to receive a call (S22), generates phone call receiving mode information when the phone call receiving mode is selected (S23), and displays the phone call receiving mode on the display 305 (S24).

In addition, the phone call receiving mode information may include a header portion indicating a connected state of a phone call, a phone call-related information display portion indicating a call participant phone number (e.g., caller phone number), a call participant name (e.g., a caller name), a call time, a key pad indicating numbers and symbols used to make a phone call, and a plurality of control buttons for performing a control of a phone call. The controller 307 graphically displays the header portion, the phone call-related information display portion, the key pad and the control buttons on the display 305, thereby allowing the user to select desired functions through the touch screen. Also, the controller 307 may not display the key pad 6-3 because there is generally no need to input a telephone number in the phone call receiving mode.

Figure 11:
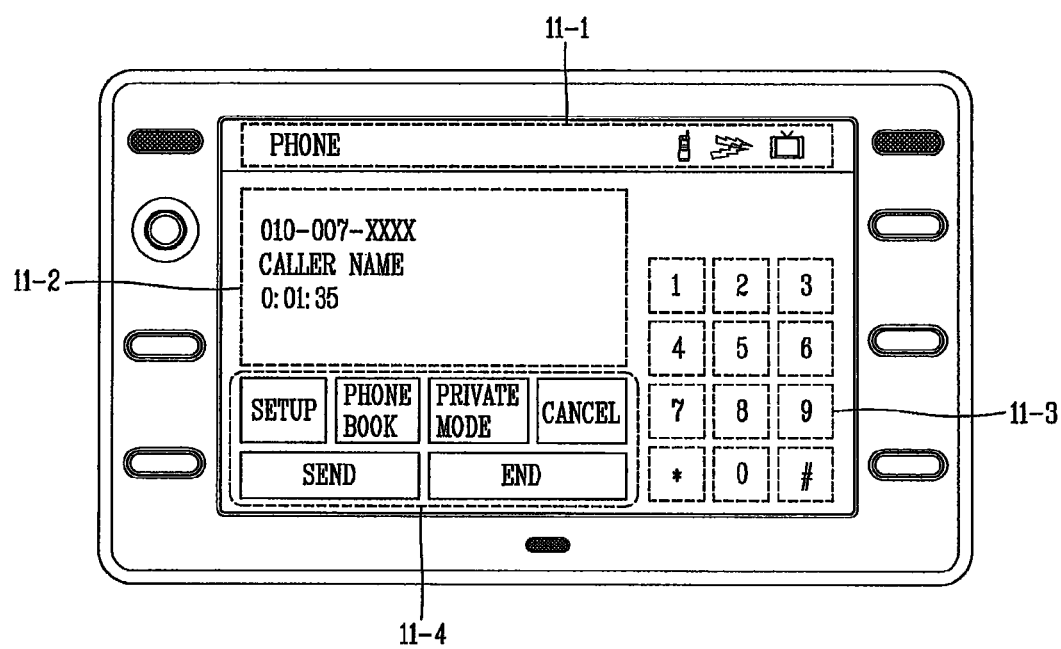
FIG. 11 is an overview of a display screen including phone call receiving mode information according to the second embodiment of the present invention.

Next, FIG. 11 is an overview of a display screen including a phone call receiving mode information according to the second embodiment of the present invention. Referring to FIG. 11, if the phone call receiving mode is selected while the route guidance information is being displayed, the controller 307 displays phone call receiving mode information on the display 305. In addition, the phone call receiving mode information includes a header portion 11-1 indicating a connected state of a phone call, a phone call-related information display portion 11-2 indicating a call participant phone number (e.g., a caller phone number), a call participant name (e.g., a caller name) and a call time, a key pad 11-3 including numbers and symbols used to make a phone call, and a plurality of control buttons 11-4 for controlling functions related to a phone call. As discussed above, the controller 307 may not display the key pad 11-3 during the phone call receiving mode.

Figure 12:
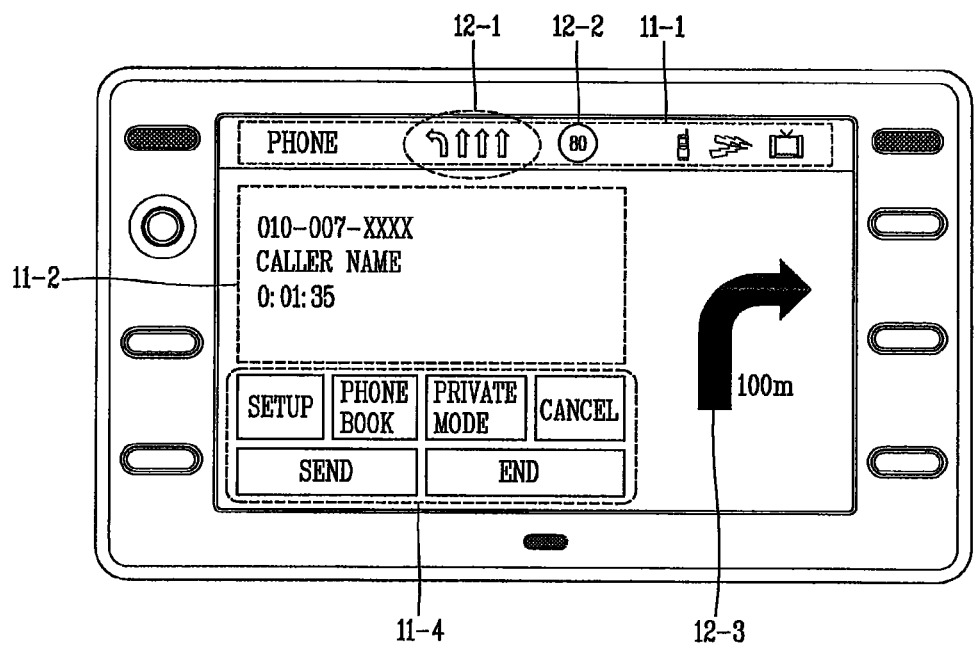
FIG. 12 is an overview of a display screen including road guidance information displayed with the phone call receiving mode information according to the second embodiment of the present invention.

Then, with reference to FIG. 10, in the phone call connected state, the controller 307 displays the route guidance information within a display area of the phone call receiving mode information displayed on the display 305 (S25). For example, FIG. 12 is an overview of a display screen including route guidance information displayed with phone call receiving mode information according to the second embodiment of the present invention. Referring to FIG. 12, if the phone call receiving mode is selected while the route guidance information is being displayed, the controller 307 displays lane information 12-1 and a speed limit 12-2 on the header portion 11-1, and displays turn-by-turn information 12-3 instead of the key pad 11-3. Accordingly, by displaying the turn-by-turn information 12-3 on the position of the key pad 11-3, and not on the phone call-related information display portion 11-2, the user may easily recognize the turn-by-turn information 12-3. Also, the controller 307 may display the turn-by-turn information 12-3 in a larger size.

Figure 13:
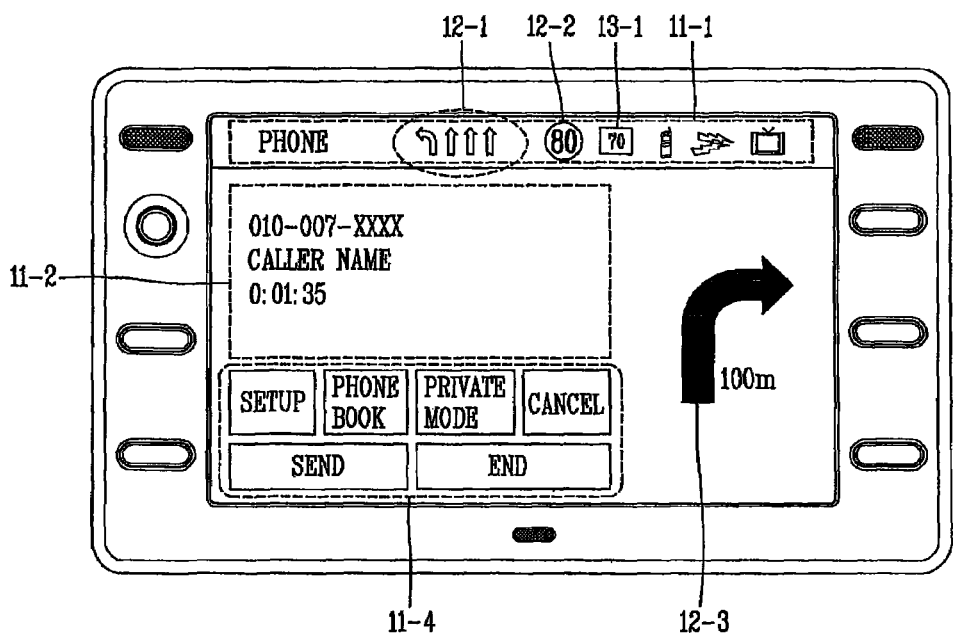
FIG. 13 is an overview of a display screen including current speed information displayed with the phone call receiving mode information according to the second embodiment of the present invention.

Next, FIG. 13 is an overview of a display screen including current speed information displayed on the phone call receiving mode information according to the second embodiment of the present invention. Referring to FIG. 13, if the phone call receiving mode is selected while the route guidance information is being displayed, the controller 307 may further display a current speed 13-1 of the vehicle on the header portion 11-1. Also, the controller 307 may enlarge a size of a numerical figure representing the speed limit 12-2 and reduce a size of a numerical figure representing the current speed 13-1 of a vehicle, thereby allowing the user to easily distinguish the speed limit 12-2 and the current speed 13-1 from each other. The controller 307 may also display the speed limit 12-2 and the current speed 13-1 in the form of one or more of a color, an icon, an avatar, a pattern and a symbol as well as the size of the numerical figure.

Figure 14:
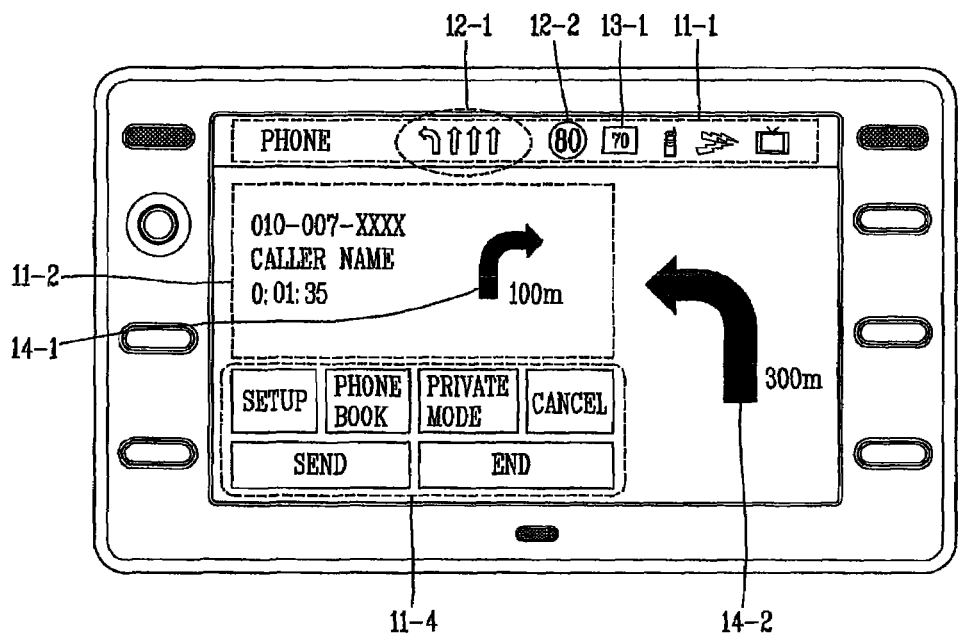
FIG. 14 is an overview of a display screen including current turn-by-turn information and next turn-by-turn information displayed with the phone call receiving mode information according to the second embodiment of the present invention.

Next, FIG. 14 is an overview of a display screen including current turn-by-turn information and the next turn-by-turn information displayed on the phone call receiving mode information according to the second embodiment of the present invention. Referring to FIG. 14, if the phone call receiving mode is selected while the route guidance information is being displayed, the controller 307 displays current turn-by-turn information 14-1 on the phone call-related information display portion 11-2, and displays the next turn-by-turn information 14-2 instead of the keypad 11-3. For instance, the controller 307 displays on the phone call-related information display portion 11-2, the current turn-by-turn information 14-1 indicating a right-turn at 100 m ahead, and displays the next turn-by-turn information 14-2 indicating a left-turn at 300 m ahead, instead of the key pad 11-3. Alternatively, the controller 307 may display the next turn-by-turn information 14-2 on the phone call-related information display portion 11-2, and display the current turn-by-turn information 14-1 instead of the key pad 11-3. That is, the controller 307 may not display the key pad 11-3 during the phone call receiving mode, and display the first turn-by-turn information on the phone call-related information display portion and the second turn-by-turn information on the position where the key pad was displayed.

Figure 15:
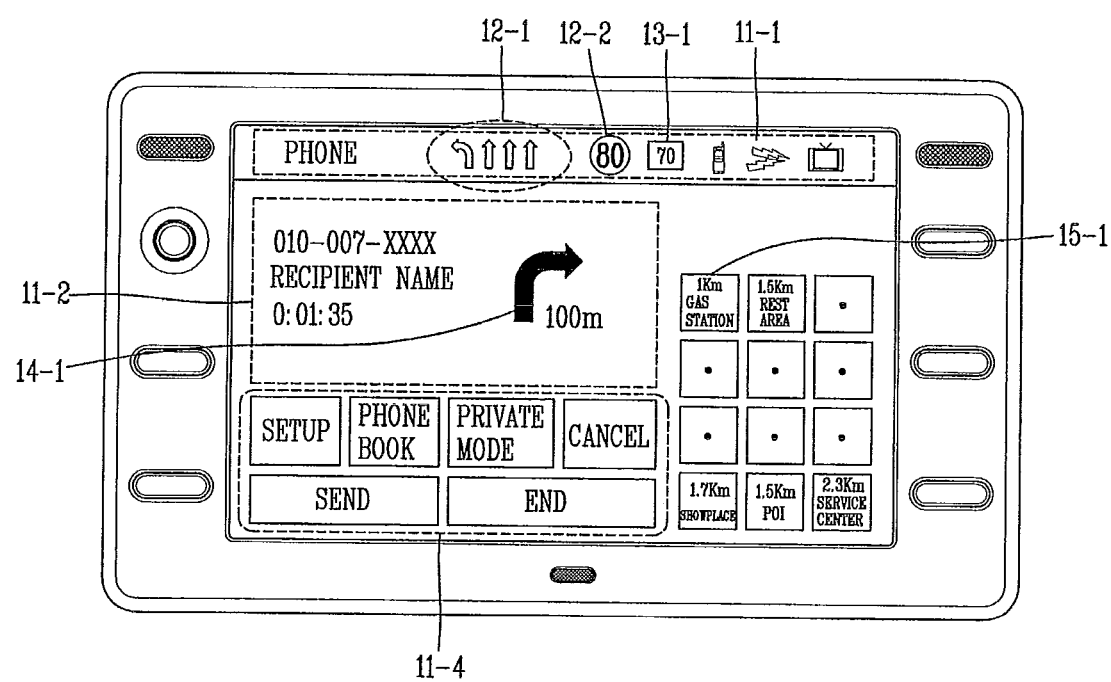
FIG. 15 is an overview of a display screen including point of interest (POI) information displayed with the phone call receiving mode information according to a third embodiment of the present invention.

Next, FIG. 15 is an overview of a display screen including point of interest (POI) information displayed on the phone call receiving mode information according to a third embodiment of the present invention. Referring to FIG. 15, if the phone call receiving mode is selected while the route guidance information is being displayed, the controller 307 displays the current turn-by-turn information 14-1 on the phone call-related information display portion 11-2, and displays POI information 15-1 instead of the key pad 11-3. For instance, the controller 307 displays on each key display area of the key pad 11-3 POI information adjacent to a current vehicle position in the form of a text or an icon, instead of numerical figures or symbols. That is, the controller 307 detects a gas station adjacent to the current vehicle position, and displays, on a single key, a preset icon (or a text, a symbol, etc.) representing the detected gas station and information related to a distance from the current vehicle position to the gas station. In addition, the controller 307 detects a service center adjacent to the current vehicle position, and displays, on a single key, a preset icon (or a text, a symbol, etc.) representing the detected service center and information related to a distance from the current vehicle position to the service center. In addition, the POI information may be a gas station, a resting place, a restaurant, a service center, a tourist spot, a resort or the like.

Also, if a specific icon (e.g., the service center) is selected on the POI information 15-1, the controller 307 sets a position corresponding to the selected icon as an intermediate point, and displays route guidance information from the current vehicle position to the set intermediate point. Further, the POI information may be displayed on corresponding positions of the key pad 11-3 in accordance with a current position of the vehicle. For example, if the gas station is ahead and to the left of the vehicle's current position, the controller 307 can display the POI information for the gas station on the key position #1 as shown in FIG. 15. Thus, the driver can quickly get an intuitive feeling about where particular POIs are located by looking at the arrangement of POIs being displayed in a keypad form.

Figure 16:
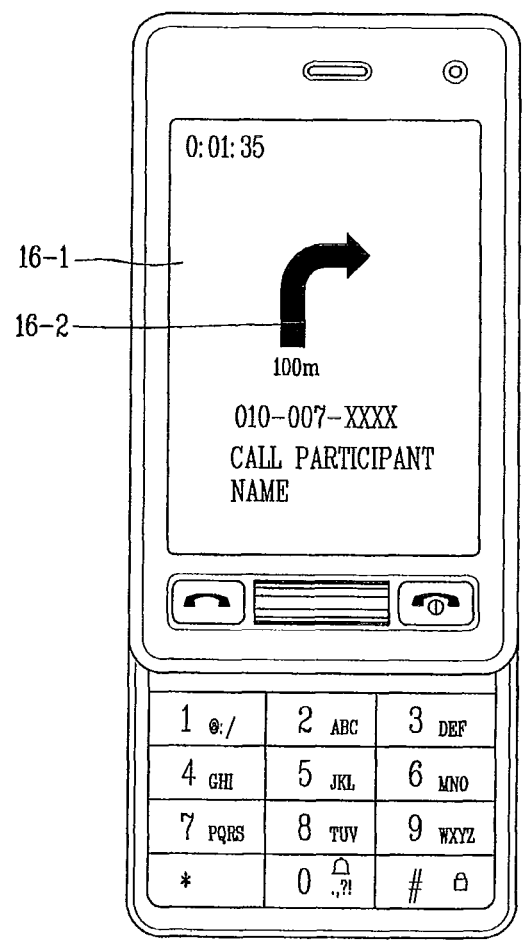
FIG. 16 is an overview of a display screen including turn-by-turn information displayed with the phone call mode information according to a fourth embodiment of the present invention.

Next, a description of the navigation apparatus 300 applied to the mobile communication terminal 100 according to embodiments of the present invention will be described. For example, FIG. 16 is an overview of a mobile terminal displaying turn-by-turn information on phone call mode information according to a fourth embodiment of the present invention. Referring to FIG. 16, if a phone call mode (phone call sending/receiving mode) is selected while the route guidance information is being displayed, the controller 180 of the mobile communication terminal 100 displays turn-by-turn information 16-2 on a phone call-related information display portion 16-1. For instance, when the phone call mode (phone call sending or receiving) is selected while the route guidance information is being displayed, the controller 180 displays the turn-by-turn information 16-2 together with a call participant phone number, a call participant name and a call time on the phone call-related information display portion 16-1.

Meanwhile, if the phone call mode is selected while the route guidance information is being displayed, the controller 180 (or the controller 307) according to the embodiments of the present invention may display the route guidance information within a display area of the phone call-related information, and simultaneously, may output voice information corresponding to the route guidance information through the voice output unit 306. Therefore, the navigation method and apparatus according to the embodiments of the present invention displays the route guidance information on the display, and displays the route guidance information on the phone call mode information during the phone call mode, thereby enabling the user to effectively receive the route guidance information during the phone call.

Figure 17:
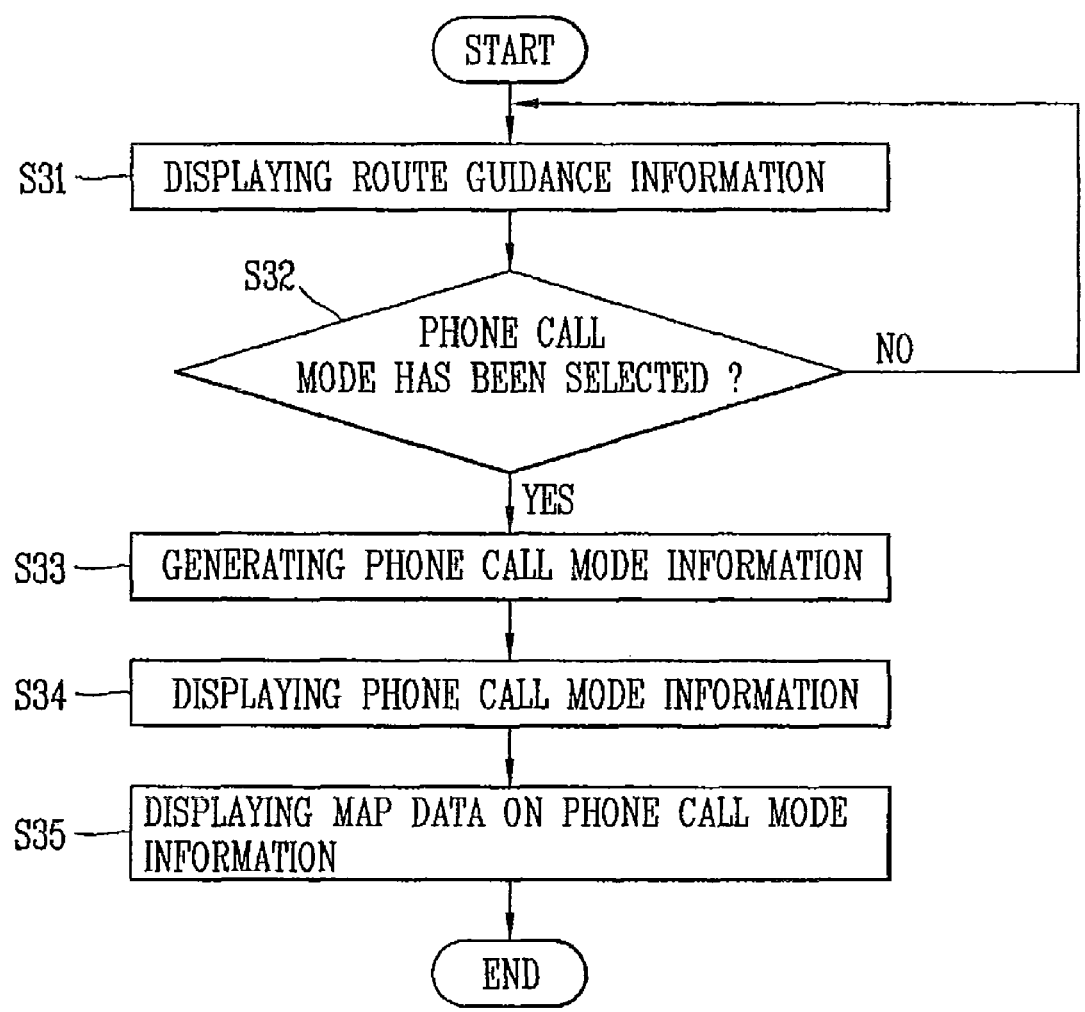
FIG. 17 is a flowchart illustrating a navigation method according to a fifth embodiment of the present invention.

Next, FIG. 17 is a flowchart illustrating a navigation method according to a fifth embodiment of the present invention. Similar to the first embodiment, the map matching unit 303 generates an estimated vehicle position based on the first vehicle position data and the second vehicle position data, and reads map data corresponding to a traveling route from the storage unit 304. Also, the traveling route may be a traveling route from a departing place to a destination, or a traveling route without any selected destination.

The map matching unit 303 also matches the estimated vehicle position to a link (road) included in the map data, and then outputs the matched map information (map matching result) to the controller 307. For instance, the map matching unit 303 generates the estimated position of the vehicle based on the first and second vehicle position data, matches the generated vehicle position to the links in the map data stored in the storage unit 304 according to a link sequence, and then outputs the matched map information (map matching result) to the controller 307.

The controller 307 then generates route guidance information based on the matched map information, and outputs the generated route guidance information to the display 305 and the voice output unit 306. The display 305 displays the route guidance information and the voice output unit outputs voice information corresponding to or included in the route guidance information (S31). The controller 307 also simultaneously determines a connected state of the phone call through the hands-free module 308. For instance, the controller 307 determines whether or not the user has selected the phone call mode to make a phone call (S32), generates phone call mode information when the phone call mode is selected (S33), and displays the phone call mode information on the display 305 (S34).

The phone call mode information may include a header portion indicating a connected state of a phone call, a phone call-related information display portion indicating a call participant phone number (e.g., a caller phone number), a call participant name (e.g., a caller name), a call time, a key pad indicating numbers and symbols used to make a phone call, and a plurality of control buttons for controlling functions related to a phone call. The controller 307 displays the header portion, the phone call-related information display portion, the key pad and the control buttons on the display 305 as a graphical object, thereby allowing the user to select desired functions through the touch screen.

Figure 18:
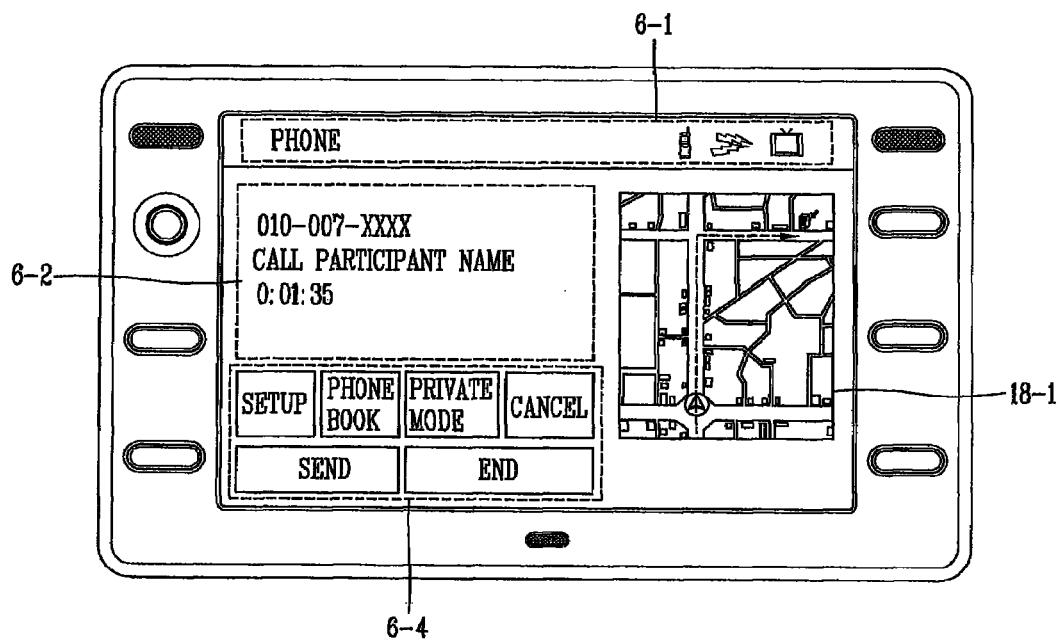
FIG. 18 is an overview of a display screen including road guidance information displayed with the phone call mode information according to the fifth embodiment of the present invention.

Then, in the phone call connected state, the controller 307 displays the map data within a display area of the phone call mode information displayed on the display 305 (S35). For example, FIG. 18 is an overview of a display screen including route guidance information displayed on phone call mode information according to the fifth embodiment of the present invention. Referring to FIG. 18, if the phone call mode is selected while the route guidance information is being displayed, the controller 307 displays the phone call mode information on the display 305. The controller 307 does not display the key pad 6-3 including the numbers and symbols used to make a phone call, and instead, displays map data 18-1 on a position where the key pad 6-3 was displayed. Also, the map data 18-1 denotes the map information matched by the map matching unit 303 (map matching result).

Figure 19:
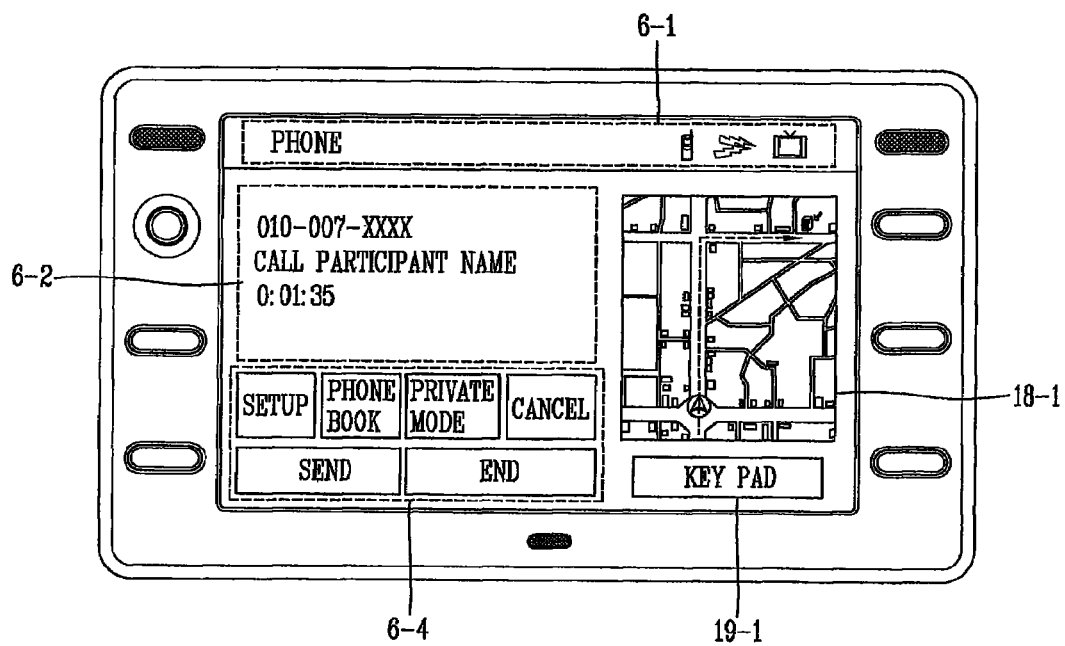
FIG. 19 is an overview of a display screen including phone call mode information according to a sixth embodiment of the present invention.

Then, during the phone call connected state, the controller 307 displays the route guidance information on the phone call mode information displayed on the display 305. For example, FIG. 19 is an overview of a display screen including displayed phone call mode information according to a sixth embodiment of the present invention. Referring to FIG. 19, if the phone call mode is selected while the route guidance information is being displayed, the controller 307 can display the map data 18-1 on the position where the key pad 6-3 including the numbers and symbols used to make a phone call is displayed, and simultaneously, further display a keypad button 19-1 for displaying the key pad 6-3. For instance, if the phone call mode is selected while the route guidance information is being displayed, the controller 307 displays the map data 18-1 on the position where the keypad 6-3 is displayed, and displays the keypad button 19-1 at a lower end of the map data 18-1 so as to switch or toggle the map data 18-1 into the keypad 6-3 by a user's selection.

If the phone call mode is selected while the route guidance information is being displayed, the controller 307 displays the keypad 6-3 and determines whether or not a preset period of time (e.g., 3~5 seconds) has passed. When the preset period of time has passed, the keypad 6-3 is not displayed, thereby automatically displaying the map data 18-1 on the position of the previously appeared keypad 6-3.

Figure 20:
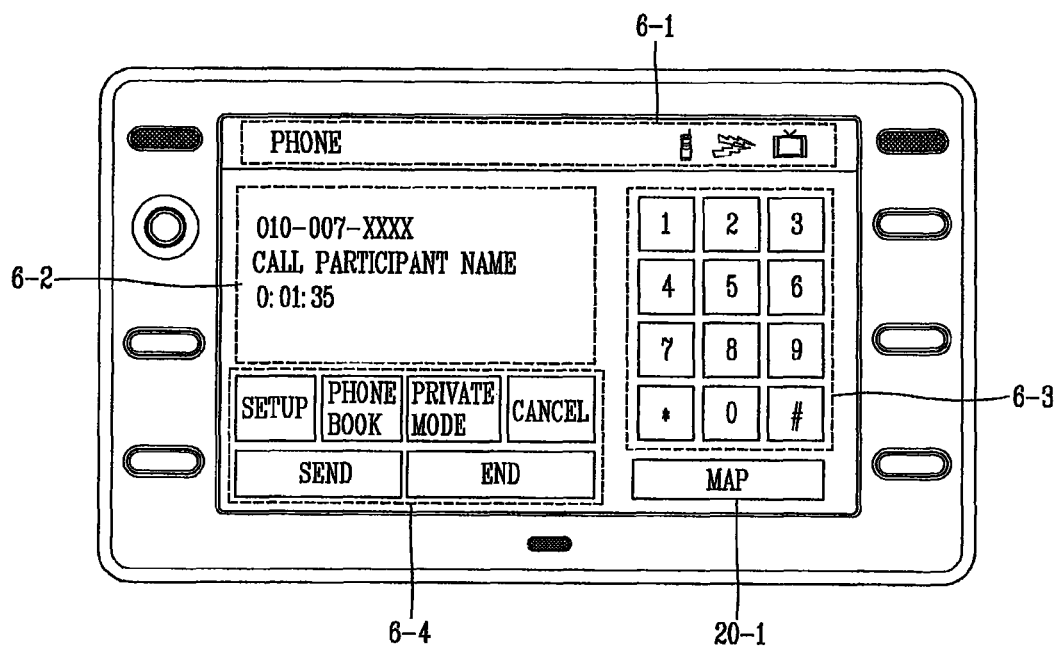
FIG. 20 is an overview of a display screen including phone call mode information according to a seventh embodiment of the present invention.

Next, FIG. 20 is an overview of a display screen including displayed phone call mode information according to a seventh embodiment of the present invention. Referring to FIG. 20, if the phone call mode is selected while the route guidance information is being displayed, the controller 307 can further display a map button 20-1 for displaying the map data 18-1 on the position of the keypad 6-3. For instance, if the phone call mode is selected while the route guidance information is being displayed, the controller 307 displays the key pad 6-3 as well as displays the map button 20-1 at the lower end of the keypad 6-3 so as to switch or toggle the keypad 6-3 into the map data 18-1 by a user's selection. Therefore, the user may select the map data 18-1 or the keypad 6-3 even during the phone call by selecting the keypad button 19-1 or the map button 20-1, respectively.

Figure 21:
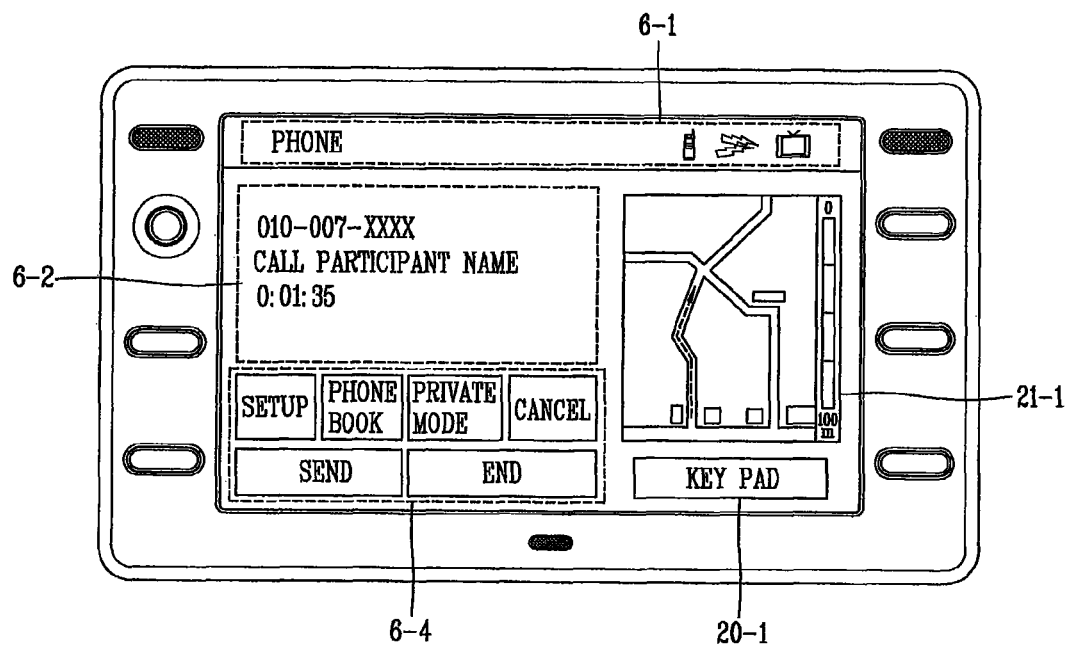
FIG. 21 is an overview of a display screen including phone call mode information according to an eighth embodiment of the present invention.

FIG. 21 is an overview of a display screen including displayed phone call mode information according to an eighth embodiment of the present invention. Referring to FIG. 21, if the phone call mode is selected while the route guidance information is being displayed, the controller 307 displays the map data 18-1 on the position of the keypad 6-3, and then determines whether the current vehicle position enters a busy road or intersection. If the current vehicle position is determined to have entered the busy road or intersection, the controller 307 reads a pre-stored enlarged view 21-1 corresponding to the busy road or intersection from the storage unit 304, and displays the read enlarged view 21-1 on the position of the keypad 6-3. The controller 307 can also automatically display the enlarged view 21-1 without user intervention such that the user can see they are entering a congested area and possible see a detour route they can take.

Figure 22:
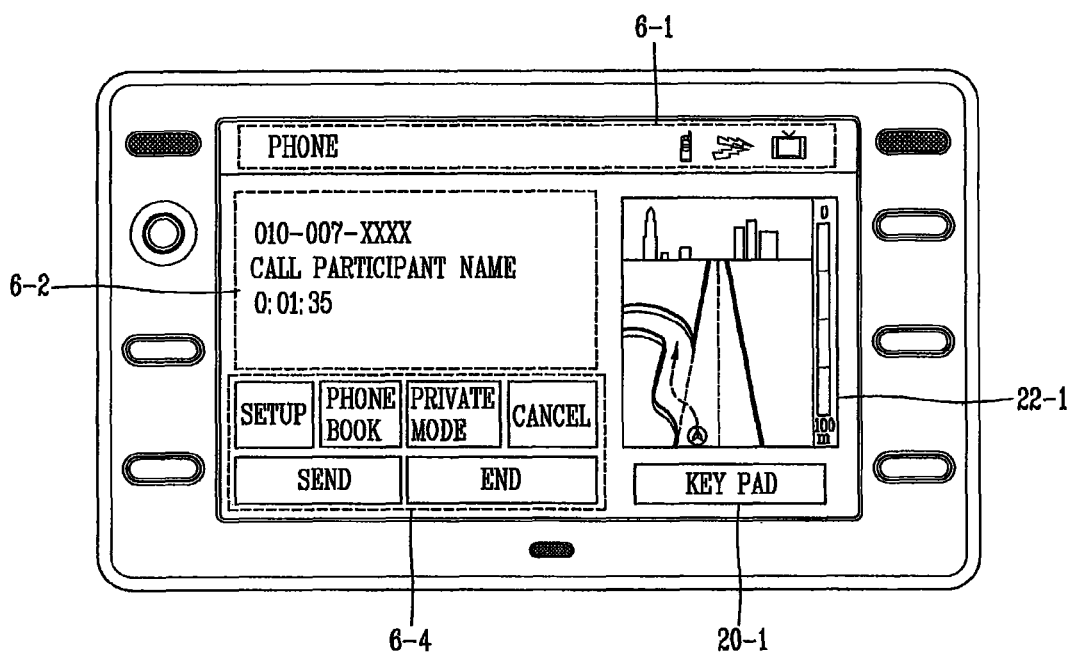
FIG. 22 is an overview of a display screen including phone call mode information according to a ninth embodiment of the present invention.

Next, FIG. 22 is an overview of a display screen including displayed phone call mode information according to a ninth embodiment of the present invention. Referring to FIG. 22, if the phone call mode is selected while the route guidance information is being displayed, the controller 307 displays the map data 18-1 on the position of the keypad 6-3, and then determines whether or not a diverged mimetic diagram 22-1 corresponding to the current vehicle position is present in the storage unit 304. If the diverged mimetic diagram 22-1 exists, the controller 307 reads the diverged mimetic diagram 22-1 from the storage unit 304, and displays the read diverged mimetic diagram 22-1 on the position of the keypad 6-3.

Figure 23:
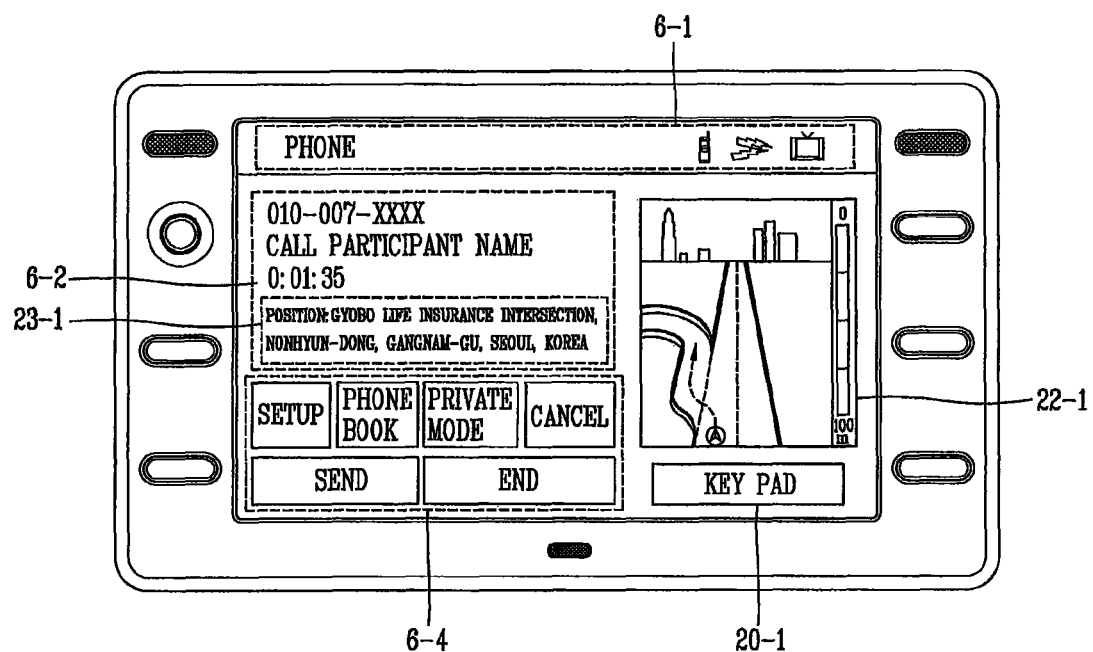
FIG. 23 is an overview of a display screen including phone call mode information according to a tenth embodiment of the present invention.

FIG. 23 is an overview of a display screen including displayed phone call mode information according to a tenth embodiment of the present invention. Referring to FIG. 23, if the phone call mode is selected while the route guidance information is being displayed, the controller 307 detects a position of a call participant, and displays the detected position 23-1 of the call participant on the phone call-related information display portion. For instance, if the user selects the phone call sending mode while the route guidance information is being displayed, the controller 307 receives current position information of the recipient's mobile terminal (e.g., a mobile phone, a navigation apparatus having a hands-free function, etc.) through a wireless communication network, and displays the received current position information on the phone call-related information display portion.

Also, if the phone call receiving mode is selected while the route guidance information is being displayed, the controller 307 receives current position information of the caller's mobile terminal (e.g., a mobile phone, a navigation apparatus having a hands-free function, etc.) through the wireless communication network, and displays the received current position information on the phone call-related information display portion. In addition, if an address corresponding to the call participant phone number is pre-stored in the storage unit 304, the controller 307 reads the address from the storage unit 304 and displays the read address on the phone call-related information display portion.

Figure 24:
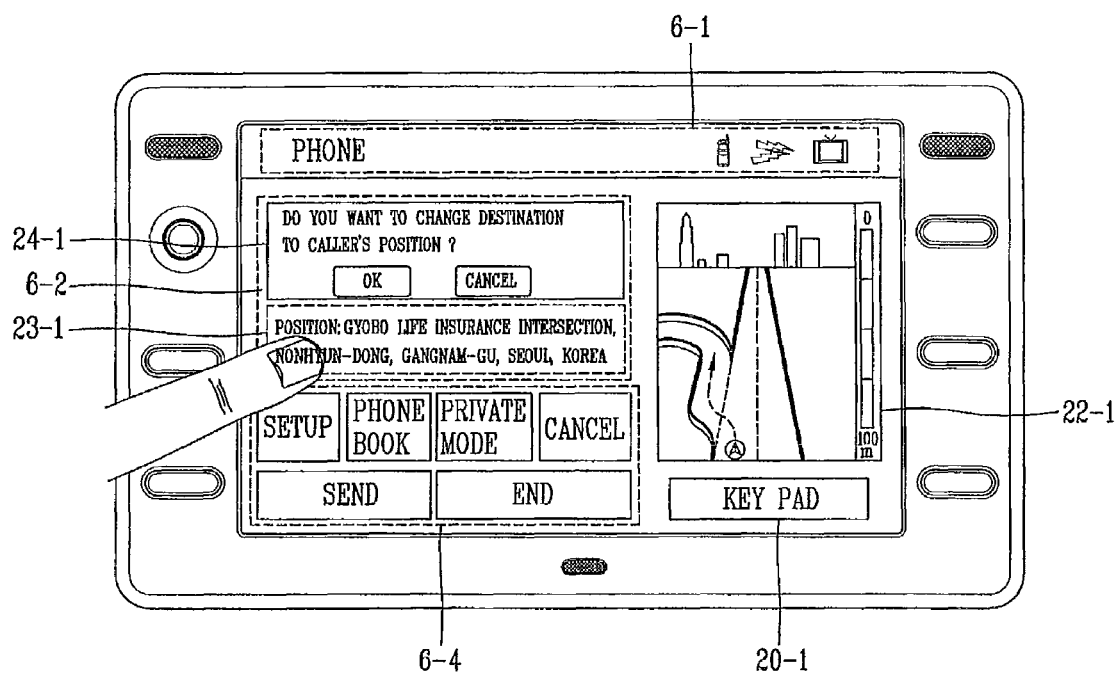
FIG. 24 is an overview of a display screen including phone call mode information according to an eleventh embodiment of the present invention.

Next, FIG. 24 is an overview of a display screen including displayed phone call mode information according to an eleventh embodiment of the present invention. Referring to FIG. 24, if the phone call mode is selected while the route guidance information is being displayed, the controller 307 detects the call participant's position, displays the detected position 23-1 of the call participant on the phone call-related information display portion, and then determines whether or not the position of the call participant 23-1 has been selected by the user. For instance, when the call participant's position 23-1 has been selected by the user through the touch screen, the controller 307 generates a popup window 24-1, asking whether to change a current destination into the call participant's position (e.g., do you want to change the destination into the position of the caller?), and then displays the generated popup window 24-1 on the display 305.

Next, when a confirmation key is selected on the popup window 24-1, the controller 307 changes the destination into the position of the caller, thereby setting a new traveling route and displaying the new traveling route on the display 305. The controller 307 may also display the popup window 24-1 on the header portion 6-1 such that the user checks phone call-related information and the map data in real time. Meanwhile, if the phone call mode is selected while the route guidance information is being displayed, the controller 180 (or the controller 307) according to the embodiments of the present invention may display the route guidance information within the display area of the phone call-related information, and simultaneously, may output voice information corresponding to the route guidance information through the voice output unit 306.

Accordingly, the navigation method and apparatus according to embodiments of the present invention display the route guidance information on the display, and display the route guidance information on the phone call mode information during the phone call, thereby allowing the user to effectively receive the route guidance service during a phone call. In addition, the navigation method and apparatus according to embodiments of the present invention display turn-by-turn information, lane information and speed limit information on the phone call mode information if the phone call mode is selected while the route guidance information is being provided, thereby effectively providing the route guidance information to the user even during a phone call mode.

Further, the navigation method and apparatus according to the embodiments of the present invention displays map data and call participant's position information on the phone call mode information if the phone call mode is selected while the route guidance information is being provided, thereby effectively providing the route guidance information to the user even during a phone call. The navigation method and apparatus according to the embodiments of the present invention may also be applied to telematics terminals and mobile communication terminals as well as mobile terminals including Personal Digital Assistants (PDA), Portable Multimedia Player (PMP) and the like.

In addition, the mobile communication terminal 100 may be implemented as various forms. For instance, the mobile communication terminal 100 may include portable phones, smart phones, notebook computers, digital multimedia broadcasting terminals, Personal Digital Assistants (PDA), Portable Multimedia Players (PMP), navigations (mobile vehicle navigation apparatus), and the like.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of controlling a mobile terminal having both a route guidance function and a phone call function, the method comprising:
    displaying, via a display unit of the mobile terminal, travel route guidance information;
    determining, via a controller of the mobile terminal, whether a phone call mode has been entered on the mobile terminal, said phone call mode corresponding to a phone call received from another terminal or a phone call made to another terminal;
    displaying, via the display unit of the mobile terminal, phone call information corresponding to the phone call mode with the displayed travel route guidance information, when the determining step determines the phone call mode has been entered;
    displaying, on the phone call information, a location information of the another terminal if the phone call mode has been entered on the mobile terminal; and changing a destination included in the displayed traveling route guidance information to a location corresponding to the location information of the another terminal if the location information has been selected,
    wherein the travel route guidance information is independent and not related to the location of said another terminal, and
    wherein a first information included in the traveling route guidance information is displayed within a display area of the phone call information, and the displayed phone call information is replaced by a second information included in the route guidance information, and
    displaying a key for toggling between traveling the route guidance information and a keypad.

2. The method of claim 1, wherein the traveling route guidance information is displayed within a same display area of the phone call information.

3. The method of claim 1, wherein the displayed phone call information comprises at least one of information indicating a connected state of the phone call corresponding to the phone call mode, a phone call-related information display portion indicating at least one of a call participant phone number, a call participant name and a call time, the keypad including numbers and symbols displayed on a specific arrangement of keys used to make the phone call, and a plurality of control keys for controlling the phone call.

4. The method of claim 1, wherein the displayed traveling route guidance information comprises at least one of map data, lane information, a speed limit and turn-by-turn directional information.

5. The method of claim 1, further comprising:
    displaying a key for hiding or showing the displayed traveling route guidance information.

6. The method of claim 3, further comprising:
    removing the keypad included in the displayed phone call information; and
    displaying the route guidance information on a position of the removed keypad.

7. The method of claim 1, wherein displaying the traveling route guidance information includes displaying current turn-by-turn information and next turn-by-turn information on the phone call information.

8. The method of claim 3, further comprising:
    displaying Point of Interest (POI) information in place of the numbers or symbols on the specific arrangement of keys.

9. The method of claim 1, wherein displaying the traveling route guidance information comprises displaying map data on the phone call information.

10. A mobile terminal having both a route guidance function and a phone call function, comprising:
    a display unit configured to display travel route guidance information; and
    a controller configured to determine whether a phone call mode has been entered on the mobile terminal, said phone call mode corresponding to a phone call received from another terminal or a phone call made to another terminal, and-to control the display unit to display phone call information corresponding to the phone call mode with the displayed travel route guidance information, when the controller determines the phone call mode has been entered, to display, on the phone call information, a location information of the another terminal if the phone call mode has been entered on the mobile terminal, and to change a destination included in the displayed traveling route guidance information to a location corresponding to the location information of the another terminal if the location information has been selected, wherein the travel route guidance information is independent and not related to the location of said another terminal, and wherein the controller configured to display, within a display area of the phone call information, a first information included in the traveling route guidance information, and to replace the displayed phone call information by a second information included in the route guidance information, and wherein the display unit is further configured to display a key for toggling between the traveling route guidance information and the keypad.

11. The mobile terminal of claim 10, wherein the display unit is further configured to display the traveling route guidance information within a same display area of the phone call information.

12. The mobile terminal of claim 10, wherein the displayed phone call information comprises at least one of information indicating a connected state of the phone call corresponding to the phone call mode, a phone call-related information display portion indicating at least one of a call participant phone number, a call participant name and a call time, the keypad including numbers and symbols displayed on a specific arrangement of keys used to make the phone call, and a plurality of control keys for performing a controlling the phone call.

13. The mobile terminal of claim 10, wherein the displayed traveling route guidance information comprises at least one of map data, lane information, a speed limit and turn-by-turn directional information.

14. The mobile terminal of claim 10, wherein the display unit is further configured to display a key for hiding or showing the displayed traveling route guidance information.

15. The mobile terminal of claim 12, wherein the display unit is further configured to remove the keypad included in the displayed phone call information, and to display the route guidance information on a position of the removed keypad.

16. The mobile terminal of claim 10, wherein the display unit is further configured to display current turn-by-turn information and next turn-by-turn information on the phone call information.

17. The mobile terminal of claim 12, wherein the display unit is further configured to display Point of Interest (POI) information in place of the numbers or symbols on the specific arrangement of keys.

18. The mobile terminal of claim 10, wherein the display unit is further configured to display map data on the phone call information.

19. The method of claim 1, wherein the travel route guidance information is displayed in a side-by-side manner with the phone call information.

20. The method of claim 19, wherein the travel route guidance information is displayed on a right side of the phone call information.

21. The mobile terminal of claim 10, wherein the travel route guidance information is displayed in a side-by-side manner with the phone call information.

22. The mobile terminal of claim 21, wherein the travel route guidance information is displayed on a right side of the phone call information.

* * * * *